(12) United States Patent
Hannigan et al.

(10) Patent No.: US 7,261,612 B1
(45) Date of Patent: Aug. 28, 2007

(54) METHODS AND SYSTEMS FOR READ-ALOUD BOOKS

(75) Inventors: Brett T. Hannigan, Portland, OR (US); Brett Alan Bradley, Portland, OR (US); Burt W. Perry, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 585 days.

(21) Appl. No.: 09/709,255

(22) Filed: Nov. 8, 2000

Related U.S. Application Data

(63) Continuation-in-part of application No. 09/571,422, filed on May 15, 2000, now Pat. No. 6,947,571.

(60) Provisional application No. 60/151,586, filed on Aug. 30, 1999.

(51) Int. Cl.
*A63H 30/00* (2006.01)
*G09B 19/00* (2006.01)
*G06K 9/00* (2006.01)

(52) U.S. Cl. ............... 446/175; 434/308; 434/315; 382/100; 382/312

(58) Field of Classification Search ............ 446/268, 446/297, 301, 341, 342, 343, 391, 392; 434/156, 434/307 R, 178, 308, 306; 709/217, 219, 709/227, 230, 250, 313, 328–329, 100, 162, 709/112, 118, 232, 287, 248, 218; 382/100, 382/162, 112, 218, 219, 232, 287, 248
See application file for complete search history.

(56) References Cited

U.S. PATENT DOCUMENTS 4,305,131 A   12/1981   Best
4,659,919 A * 4/1987   Price ............ 250/206
4,675,519 A * 6/1987   Price ............ 446/175
4,807,031 A   2/1989   Broughton
4,891,011 A   1/1990   Cook (Continued)

FOREIGN PATENT DOCUMENTS

EP            493091        7/1992

(Continued)

OTHER PUBLICATIONS

Bobick et al, "The KidsRoom: A Perceptually-Based Interactive and Immersive Story Environment," Presence, vol. 8, No. 4, Aug. 1999, 369-392.

(Continued)

*Primary Examiner*—John M. Hotalim
*Assistant Examiner*—Alex F. R. P. Rada

(57) ABSTRACT

The pages of a children's book are marked in a machine-readable manner (e.g., by imperceptible digital watermark technology). When such a page is shown to a camera-equipped computer device, the watermark is decoded, and the story text from that page is read aloud to a child. A number of variants are contemplated, including using book pages as entry points to corresponding videos; using books to link to corresponding interactive web sites or multi-player games; incorporating the camera in a plush toy; evoking different responses from the system by using the book to convey gestures to the camera; providing such functionality in cell phones, set top boxes, and Bluetooth-equipped devices; customizing read-aloud stories using words provided by the child or a parent; etc.

10 Claims, 3 Drawing Sheets

U.S. PATENT DOCUMENTS

| | | | |
|---|---|---|---|
| 5,059,126 A | | 10/1991 | Kimball |
| 5,314,336 A | * | 5/1994 | Diamond et al. ...... 235/462.38 |
| 5,450,490 A | | 9/1995 | Jensen et al. |
| 5,575,659 A | * | 11/1996 | King et al. .................. 434/317 |
| 5,613,004 A | * | 3/1997 | Cooperman et al. .......... 380/28 |
| 5,640,193 A | * | 6/1997 | Wellner ....................... 725/100 |
| 5,710,834 A | * | 1/1998 | Rhoads ........................ 382/232 |
| 5,761,686 A | * | 6/1998 | Bloomberg ................. 382/232 |
| 5,765,176 A | | 6/1998 | Bloomberg |
| 5,774,666 A | | 6/1998 | Portuesi |
| 5,788,507 A | * | 8/1998 | Redford et al. ......... 434/307 R |
| 5,795,213 A | * | 8/1998 | Goodwin .................... 434/317 |
| 5,813,861 A | | 9/1998 | Wood |
| 5,822,436 A | * | 10/1998 | Rhoads ........................ 380/54 |
| 5,838,458 A | | 11/1998 | Tsai |
| 5,841,978 A | | 11/1998 | Rhoads |
| 5,888,070 A | * | 3/1999 | La Tour et al. ............. 434/156 |
| 5,899,700 A | * | 5/1999 | Williams et al. ............ 382/306 |
| 5,905,248 A | * | 5/1999 | Russell et al. ......... 235/462.15 |
| 5,938,727 A | | 8/1999 | Ikeda |
| 5,939,695 A | | 8/1999 | Lucent |
| 5,940,595 A | * | 8/1999 | Reber et al. ................. 709/227 |
| 5,945,656 A | * | 8/1999 | Lemelson et al. ..... 235/462.01 |
| 5,950,173 A | | 9/1999 | Perkowski |
| 5,954,515 A | * | 9/1999 | Iggulden ..................... 434/317 |
| 5,963,916 A | | 10/1999 | Kaplan |
| 5,971,277 A | | 10/1999 | Cragun et al. |
| 5,979,757 A | | 11/1999 | Tracy et al. |
| 6,012,102 A | | 1/2000 | Shachar |
| 6,032,195 A | | 2/2000 | Reber et al. |
| 6,034,680 A | | 3/2000 | Kessenich et al. |
| 6,065,969 A | * | 5/2000 | Rifkin et al. ............... 434/100 |
| 6,068,485 A | * | 5/2000 | Linebarger et al. ......... 434/116 |
| 6,072,494 A | | 6/2000 | Nguyen |
| 6,081,629 A | | 6/2000 | Browning |
| 6,084,528 A | | 7/2000 | Beach et al. |
| 6,089,943 A | * | 7/2000 | Lo ............................. 446/175 |
| 6,095,418 A | | 8/2000 | Swartz |
| 6,108,656 A | | 8/2000 | Durst et al. |
| 6,115,482 A | | 9/2000 | Sears et al. |
| 6,119,944 A | | 9/2000 | Mulla et al. |
| 6,138,151 A | | 10/2000 | Reber et al. |
| 6,148,331 A | | 11/2000 | Parry |
| 6,154,738 A | | 11/2000 | Call |
| 6,160,540 A | * | 12/2000 | Fishkin et al. .............. 345/156 |
| 6,164,534 A | | 12/2000 | Rathus et al. |
| 6,195,104 B1 | | 2/2001 | Lyons |
| 6,199,048 B1 | | 3/2001 | Hudetz et al. |
| 6,243,480 B1 | | 6/2001 | Zhao et al. |
| 6,249,226 B1 | | 6/2001 | Harrison et al. |
| 6,252,598 B1 | | 6/2001 | Segen |
| 6,262,662 B1 | | 7/2001 | Back et al. |
| 6,273,421 B1 | | 8/2001 | Thalheimer et al. |
| 6,279,017 B1 | | 8/2001 | Walker |
| 6,285,924 B1 | * | 9/2001 | Okamoto et al. .............. 701/1 |
| 6,286,036 B1 | | 9/2001 | Rhoads |
| 6,311,214 B1 | * | 10/2001 | Rhoads ....................... 380/255 |
| 6,332,031 B1 | * | 12/2001 | Rhoads et al. ............. 380/232 |
| 6,363,418 B1 | | 3/2002 | Conboy et al. |
| 6,408,331 B1 | | 6/2002 | Rhoads |
| 6,484,198 B1 | | 11/2002 | Milovanovic et al. |
| 6,542,927 B2 | | 4/2003 | Rhoads |
| 6,556,690 B1 | | 4/2003 | Nelson |
| 6,573,883 B1 | | 6/2003 | Bartlett |
| 6,629,133 B1 | | 9/2003 | Philyaw et al. |
| 6,681,028 B2 | | 1/2004 | Rodriguez et al. |
| 6,738,491 B1 | | 5/2004 | Ikenoue et al. |
| 6,750,978 B1 | | 6/2004 | Marggraff et al. |
| 6,766,363 B1 | | 7/2004 | Rothschild |
| 6,783,069 B1 | | 8/2004 | Hecht |
| 2001/0001854 A1 | | 5/2001 | Schena et al. |
| 2001/0011233 A1 | | 8/2001 | Narayanaswami |
| 2003/0197054 A1 | | 10/2003 | Eunson |

FOREIGN PATENT DOCUMENTS

| | | |
|---|---|---|
| JP | 07108786 | 4/1995 |
| WO | WO9803923 | 1/1992 |

OTHER PUBLICATIONS

Bobick et al, "The KidsRoom," Communications of the ACM, vol. 43, No. 3, Mar. 2000, pp. 60-61.

Pinhanez et al, Physically Interactive Story Environments, IBM Systems Journal, vol. 39, Nos. 3&4, 2000, pp. 438-455.

Alattar, "'Smart Images' Using Digimarc's Watermarking Technology," SPIE 12th Int'l Symposium on Electronic Imaging, vol. 3971, No. 25, pp. 1-10, Jan. 2000.

Alattar, "Bridging Printed Media and the Internet via Digimarc's Watermarking Technology," 8th ACM Int'l Multimedia Conf, Nov. 4, 2000.

Bender et al, "Applications for Data Hiding," IBM Systems Journal, vol. 39, No. 3-4, pp. 547-568, 2000.

Bloomberg, "Embedding Digital Data on Paper in Iconic Text," SPIE, vol. 3027, pp. 67-80, 1997.

"D Marks the Spot," Popular Mechanics, Aug. 1, 2000.

Digimarc Stock Prospectus, Form S-1, Sep. 21, 1999, through p. 45.

Digimar Press Release, "Popular Mechanics Magazine Becomes Interactive with Digimarc MediaBridge," Apr. 25, 2000.

Digimarc press release, "Digimarc MediaBridge Reader Software Now Available To Consumers," 2 pp., Jun. 6, 2000.

Digimarc press release, "Advertising, Publishing Community Endorse Digimarc MediaBridge," Jun. 16, 2000.

Digimarc press release, "Popular Mechanics Magazine First To Use Digimar MediaBridge To Link Editorial Content to Web Site," Jul. 11, 2000.

Digimarc press release, "Digimarc MediaBridge Reader Software Now Available For Mac Users," 2 pp., Jul. 17, 2000.

Digimarc press release, "Digimarc MediaBridge Technology Now Enabled for Use with Digital Scanning Devices," Jul. 17, 2000.

Digimarc press release, "Digimarc MediaBridge Reader Software packaged with Intel Pocket PC Camera," Aug. 15, 2000.

Digimarc press release, "Smart Money First Publication to Enable Pages with Digimarc MediaBridge Technology," Aug. 16, 2000.

Digimarc press release, "Intelligencer Partners with Digimarc to MediaBridge-enable Wide Range of Commercially Printed Materials," Aug. 29, 2000.

Digimarc press release, "Digimarc MediaBridge Reader Software Expands Reach in Web Camera Market," Sep. 11, 2000.

Digimarc press release, "BriteVision Media to Link Coffee Sleeves to Relevant Web sites with Digimarc MediaBridge Technology," Oct. 25, 2000.

"Look for the *D*," excerpt from www.digimarc.com from Oct. 19, 2000, as archived by The Internet Archive (web.archive.org).

Rekimoto, "The World through the Computer: Computer Augmented Interaction with Real World Environments," Symposium on User Interface Software and Technology, 1995.

Want, "Bridging Physical and Virtual Worlds with Electronic Tags," CHI 99, May 15, 1999.

* cited by examiner

METHODS AND SYSTEMS FOR READ-ALOUD BOOKS

RELATED APPLICATION DATA

This application is a continuation-in-part of application Ser. No. 09/571,422, filed May 15, 2000 (now U.S. Pat. No. 6,947,571), which claims priority to provisional application 60/151,586, filed Aug. 30, 1999.

FIELD OF THE INVENTION

The present invention relates to entertainment devices and methods, and is particularly illustrated in the context of read-aloud children's books.

BACKGROUND AND SUMMARY OF THE INVENTION

Children learn the mechanics of turning book pages at an early age. They enjoy looking at pictures on pages, and hearing any accompanying text read-aloud. Many children have favorite books that they like to hear read over and over again. The association of seeing pictures and repeatedly hearing the words is an excellent mechanism for learning to read and learning to enjoy books.

In accordance with one embodiment of the present invention, these childhood reading experiences are complemented through use of machine-readable data in books that permit children to hear the text of a book even when an adult is not available to assist them.

In one particular arrangement, the pages of a book are marked in a generally human-imperceptible manner using digital watermark technology. For example, a story illustration (or the background of a page of text) can be subtly changed, in local luminance detail, to encode a 32 bit number (a page identifier). When the child presents the page to a web cam or the like, associated image data is sensed and processed to recover the 32 bit identifier. This identifier can then be used (locally, or by transmission to a remote data repository) to index multimedia data that is then presented to the child, as read-aloud spoken text.

The foregoing and additional features and advantages of the invention will be more readily apparent from the following detailed description, which proceeds with reference to the accompanying drawings.

DETAILED DESCRIPTION

Figure 1:
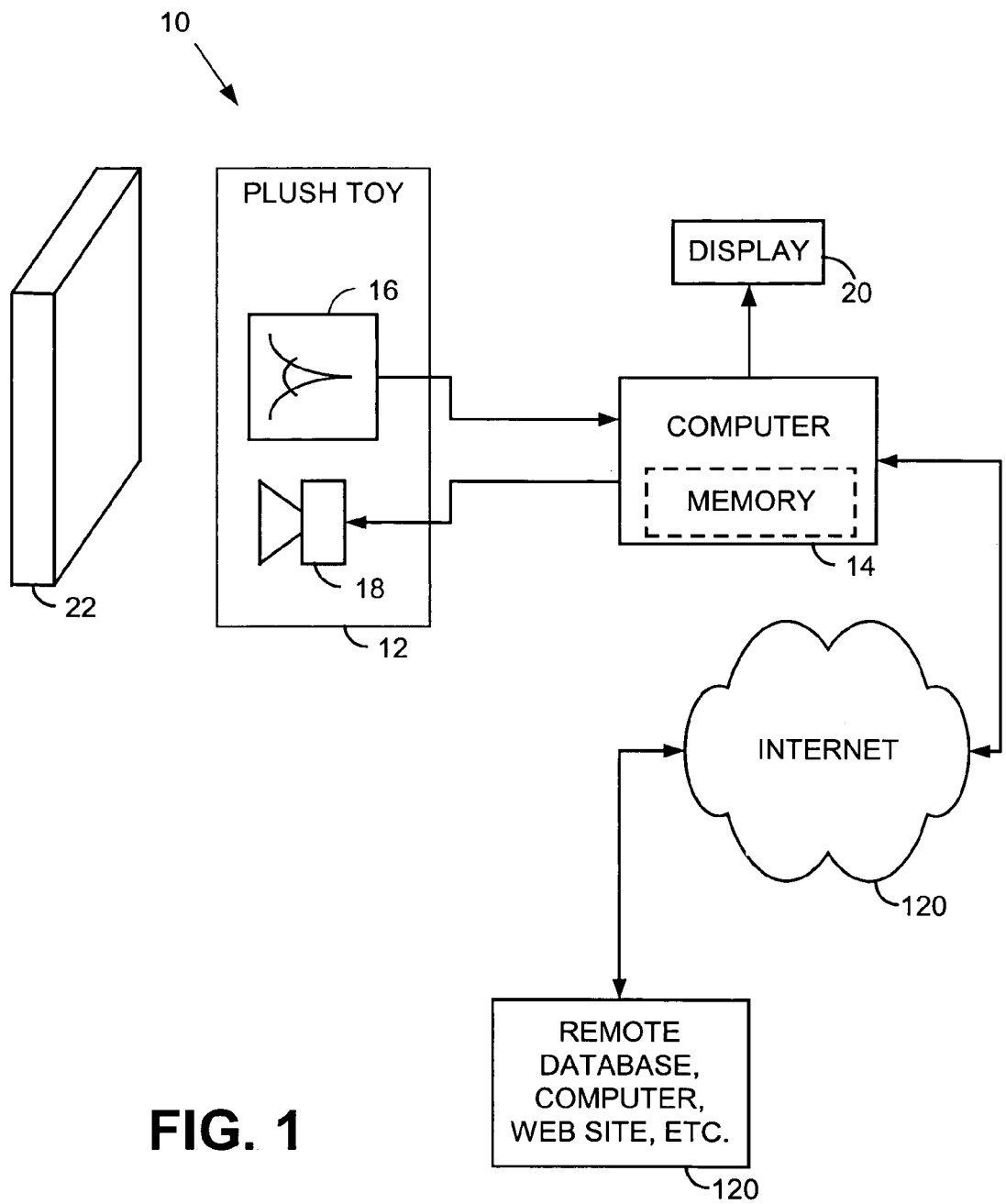
FIG. 1 is a block diagram depicting one embodiment of the present invention.
Figure 2:
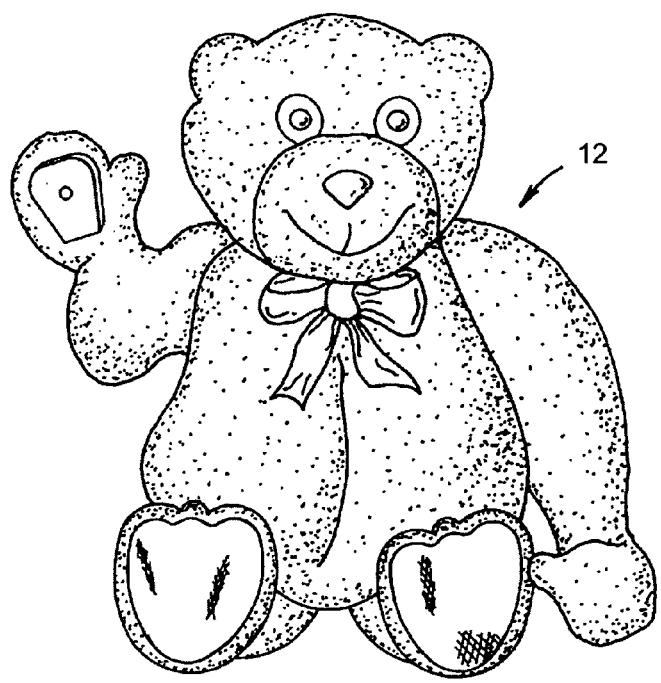
FIG. 2 shows a stuffed animal.

Referring to FIGS. 1 and 2, a system 10 according to one embodiment of the invention includes a toy 12 and a computer device 14. The toy (e.g., a doll or stuffed animal) includes, concealed within it, an image sensor 16 and a speaker 18. (The image sensor may view out of one of the toy's eyes.) The computer can be as complex or as simple as system constraints dictate. Typically, the computer includes a processor and a memory. A display 20 may be integrally provided as part of the computer device, or it may be separate.

In use, a child presents a page of a book 22 to the image sensor within the toy 12. Inage data acquired by the sensor is passed to the computer device, and analyzed to decode the machine readable page identifier data therein. This identifier is then used to index a data store that includes, e.g., text or digitized speech data corresponding to the presented page. This data can be local (e.g., stored on a hard disk within the computer device 14) or remote. In the later case, the computer device can use known means, such as the internet, to link to a remote repository at which the speech data is stored. This data is then transferred back to the local system, where it is rendered for the child. The child can then show the next page to the toy and repeat the process.

The foregoing description describes an elementary system. A great number of enhancements can be made.

For example, speech is not the only response that can be triggered by display of a book page to the sensor. Essentially any other response or action can also be triggered. One is to present supplementary image or video information on the display 20, such as alternate illustrations. Another is to retrieve line artwork related to the story that can be printed by the child and colored. Etc.

If the data repository is remote, the data latency between sending a request for speech data, and receiving the requested speech data back, may introduce an objectionable delay. Accordingly, the system can be arranged to pre-fetch anticipated data. Thus, for example, if a child presents page 1 of *The Cat in the Hat* to the image sensor, and the computer queries the remote data repository for the page 1 speech data, it can thereafter immediately solicit the data corresponding to pages 2, 3, 4, etc., and cache such data locally for their anticipated next use.

The narration accompanying a book can be customized with the reader's name, street name, hometown, friends' names, etc., as appropriate. Thus, the hero of a book can be given the reader's first name, live in the same town, etc. (Such data can be stored locally, e.g., in an XML data file indicating <HERO>="David"; <TOWN>="Portland," etc.) The narration text can be flagged at places with corresponding XML tags. When the narration text comes to a <HERO>tag, it can check to see whether customized <HERO>data is available and, if so, whether it has been enabled for use. In such case, the name "David" will be substituted. Else, the usual (default) hero name from the narration data will be employed.

Yet another enhancement is to let the reader chose how the plot unfolds. Such "chose your own adventure" books are now popular with older juvenile readers, and specify to what page the reader should turn, depending on the desired story action. Thus, the bottom of a page may indicate "Turn to page 137 if you want Nancy Drew to climb down into the cave; turn to page 216 if you want her to avoid the cave." Through such branching, the reader can explore many "what if" plot scenarios within a single book.

Such functionality can also be achieved in accordance with the present invention. For example, the rendered speech from one page can instruct the child, "If you want the Cat in the Hat to open mother's closet door, move the book up and down. If you want the Cat in the Hat to stay out of mother's closet, move the book from side to side." The computer can detect such gestures from the image data, and invoke different actions (e.g., tell different story lines, or present different video accompaniment) accordingly.

Book pages can also be used as indices to DVD movies and the like. Consider the popular Harry Potter books, for which corresponding movies are being produced. If a child wants to view the movie excerpt where Harry fights the dragon, that page of the book can be shown to an image sensor. The computer decodes a watermark from that page and instructs a DVD player associated with the system to advance to a corresponding frame number and begin playing.

In such systems, different book pages are watermarked with different identifiers. (Each page may have a unique identifier, or all pages in a chapter may have a common identifier, etc.) These identifiers may be literal frame numbers of the corresponding video production, but more generally are not. Instead, the mapping of page identifiers to frame numbers is typically performed by a data structure, such as a database, that has a record for each identifier, containing the corresponding page number and, perhaps, other information. The output from the data structure is provided to the control processor in the DVD player, and causes it to advance to the specified video location and begin playing.

Figure 3:
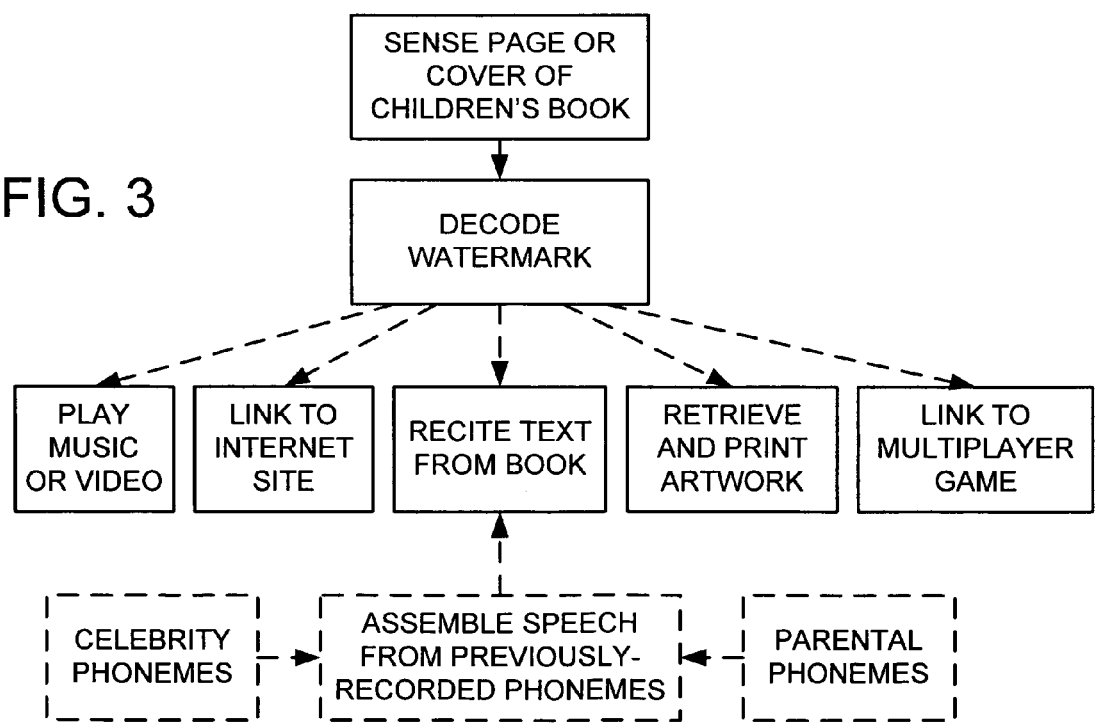
FIG. 3 is a flow chart showing methods incorporating aspects of certain embodiments.
Figure 4:
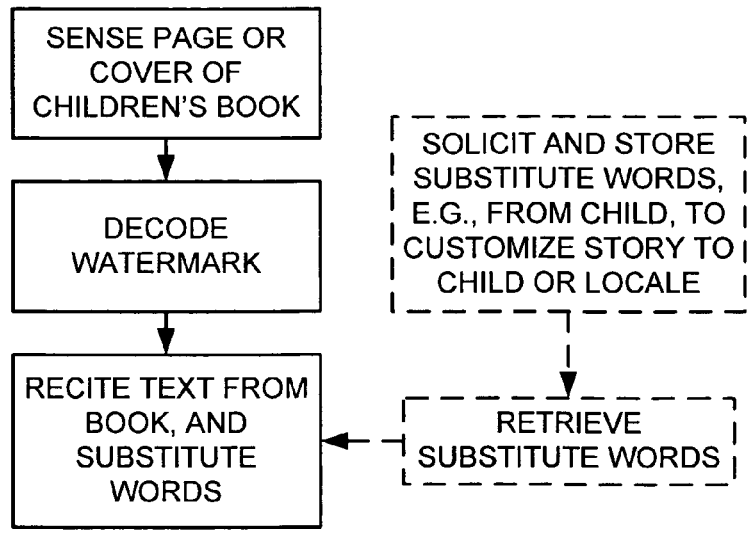
FIG. 4 is a flow chart showing methods incorporating other aspects of certain embodiments.
Figure 5:
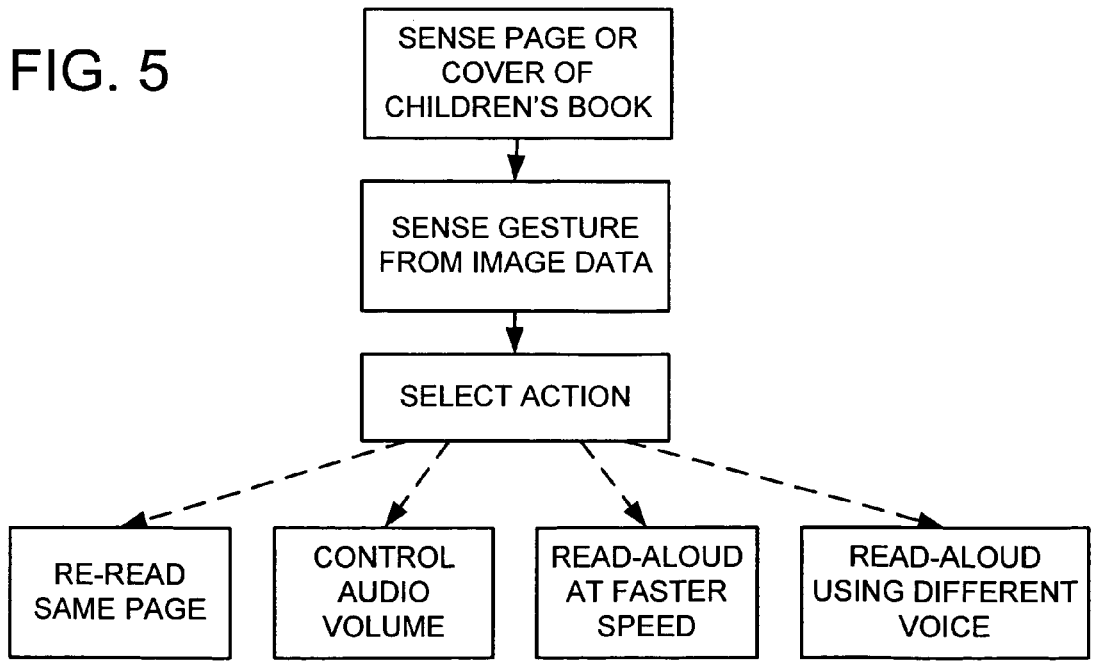
FIG. 5 is a flow chart showing methods incorporating still other aspects of certain embodiments.

Flow charts illustrating certain of the foregoing embodiments are presented in FIGS. 3–5.

The parent application details a great variety of systems in which physical objects are encoded with digital data, sensed with a web cam or the like, and then used to invoke some computer-controlled action. Illustrative systems and infrastructures associated with such technologies are detailed in that application and so are not belabored here.

Likewise, a great variety of particular watermarking techniques are known to artisans in the field, and are not belabored here. One particular technique is shown in application Ser. No. 09/503,881, filed Feb. 14, 2000.

To provide a comprehensive disclosure without unduly lengthening this specification, the above-cited patent applications are incorporated herein by reference.

Having described and illustrated the principles of the invention with reference to illustrative embodiments, it should be recognized that the invention is not so limited.

For example, while the preferred embodiment employed digital watermarking to mark pages, other machine-readable data representations can be used instead (e.g., bar codes, glyphs, RF IDs, mag stripes, smart card technology, etc.).

More generally, the invention is not limited to use with children's books. For example, the same principles can be employed to provide read-aloud functionality with adult reading materials, e.g., for the blind or visually impaired. Moreover, the invention is not limited to books, but can be used in conjunction with any object for which supplementary audio or video would enhance a user experience (e.g., baseball cards that link to videos of famous plays; comic books that link to previews of the next issue, etc.)

The principles of the invention can be used in contexts other than reading-aloud. For example, showing a book page (or book cover) to the system can initiate playback of mood music to accompany the child's independent reading (silent, or aloud) of the story.

Showing the page to the image sensor can alternatively link to an interactive web page. For example, a watermark in the book *Yertle the Turtle* (or on a front/back cover) can lead to a web page focused on turtles; a watermark in *The Lorax* can link to an environmental web page tailored for children. Etc.

Likewise, the watermark can link to an interactive internet game, or other immersive experience. (E.g., Nancy Drew finds herself in a cave. The reader, together with hundreds of other children who are reading the same story at the same time, hunt for clues to solve the mystery—either independently or collaboratively. Prizes may be awarded to readers who solve the puzzle, such as a five dollar coupon for Amazon.com. Through choices the reader makes, an interactive web experience may lead to a different story outcome than the printed book.)

The present technology can be used with media other than books. For example, a child may receive a watermarked birthday card from Grandma. When the card is shown to the plush toy, the system could place a telephone call to Grandma—allowing her to convey personal birthday greetings to the child.

The reference to computer devices in the foregoing discussion should not be taken as limiting applicability of the invention to any particular form of hardware (e.g., desktop computers). For example, a cell phone equipped with an optical sensor, a headset, and internet connectivity can be employed to sense book pages, and render corresponding audio—a boon for families on long car trips. Set top boxes can also provide such functionality, and make use of the audio and display capabilities of an associated television receiver. Popular gaming platforms (e.g., PlayStation 2) can be adapted for such use. A plush toy incorporating the camera can be self-contained with a built-in processor, and be linked to a display device (e.g., a television) by wireless (e.g., Bluetooth). Etc.

The incorporation of the web cam and the speaker within a plush toy is suitable in some embodiments, but in other embodiments these devices can be incorporated into different objects (e.g., the housing of a computer display), or used independently.

While reference was made to DVD videos that are indexed by data encoded on book pages, the same principles can be employed in other contexts. For example, instead of indexing a video stored on DVD, the video can be obtained from a remote source, such as a cable TV system or streaming internet video, and rendered starting from a point determined by the book page.

A number of different text-to-speech technologies are known, and so are not belabored here. But this aspect of the system is subject to many variations. For example, the voice with which a book is read can be the child's parent. The parent can record a read-aloud session, with each page of reading being stored in a different data file (or database record). Playback of these files/records can then be triggered by detection of watermarks from the corresponding book pages. Similarly, the child's own voice can be employed in the same manner.

While the foregoing approach requires each book to be read-through once in order to record the voice, other approaches do not have this requirement. Instead, the speech can be synthesized from component utterances (e.g., common words and phonemes) that are patched together to create arbitrary speech. (Such systems require training, e.g., by the speaker reading a prescribed passage of text from which the component words and sounds are recognized, parsed, and stored for later use.) The component parts can be stored locally and assembled by the computer 14. Or they can be stored remotely (e.g., accessed over the internet), and assembled either by the computer 14 or a remote computer. By such arrangements, a child can be read a story by a familiar voice, even if that person has never before seen the book.

A variety of celebrity and family voices can be available for read-aloud purposes, using the foregoing or other approaches. Thus, for example, a child can select to have a story read by Barney, Sesame Street's Cookie Monster, mom, dad, a favorite uncle, etc. Images or video associated with the reader can be presented on the display screen during the reading.

The above-described substitution of the child's name, hometown, etc., in the story line is one variant of "Mad Libs," in which arbitrary words are substituted into a text. Other such Mad Lib variants can be employed. For example, after a child has become familiar with a story (e.g., a poem from the Monster Motel book), the stuffed animal (i.e., the computer, through the speaker) can ask the child if she would like to play a game. The animal could then explain what an adjective is—a word that describes something, such as "blue" or "funny"—and ask the child to propose such a word. Likewise the animal could ask the child for one or more nouns, verbs, and adverbs. After recording a suitable collection of words, the system could read the poem, substituting the child's words for key words in the poem.

Reference was made, above, to the system being responsive to gestures made by the child with the book, triggering different responses. This area, too, is subject to a great number of variants. For example, one gesture could cause reading of the page to start over. Another could speed up the voice. Another could select among different reading voices. Another could initiate internet-based functionality (as described above). Another could change the reading volume, etc. (Many gestures, and methods of their detection, are detailed in the parent application. Excerpts from that application are reproduced below. That application uses the term "Bedoop" for systems that respond to visual commands, and "Bedoop data" for data discerned from steganographic encoding on physical objects.)

Gestural Decoding Module

There are various ways in which the system's decoding of gestural input can be effected. In some systems, this functionality is provided as part of the applications. Generally, however, the applications must be provided with the raw frame data in order to discern the gestural movements. Since this functionality is typically utilized by many applications, it is generally preferable to provide a single set of gestural interpretation software functions (commonly at the operating system level) to analyze the frame data, and make available gestural output data in standardized form to all applications.

In one such system, a gestural decoding module tracks the encoded object within the series of image data frames, and outputs various parameters characterizing the object's position and manipulation over time. Two of these parameters indicate the X-Y position of the object within current frame of image data. The module can identify a reference point (or several) on the object, and output two corresponding position data (X and Y). The first represents the horizontal offset of the reference point from the center of the image frame, represented as a percentage of frame width. A two's complement representation, or other representation capable of expressing both positive and negative values, can be used so that this parameter has a positive value if the reference point is right of center-frame, and has a negative value if the reference point is left of center frame. The second parameter, Y, similarly characterizes the position of the reference point above or below center-frame (with above-being represented by a positive value). Each of these two parameters can be expressed as a seven-bit byte. A new pair of X, Y parameters is output from the gestural decoding module each time a new frame of image data is processed.

In many applications, the absolute X-Y position of the object is not important. Rather, it is the movement of the object in X and Y from frame-to-frame that controls some aspect of the system's response. The application can monitor the change in the two above-described parameters, frame to frame, to discern such movement. More commonly, however, the gestural decoding module performs this function and outputs two further parameters, X' and Y'. The former indicates the movement of the reference point in right/left directions since the last image frame, as a percentage of the full-frame width. Again, this parameter is represented in two's complement form, with positive values representing movement in the rightward direction, and negative values representing movement in the leftward direction. The later parameter similarly indicates the movement of the reference point in up/down directions since the last frame.

The scale, differential scale, and rotation states of the object can be similarly analyzed and represented by parameters output from the gestural decoding module.

Scale state can be discerned by reference to two (or more) reference points on the object (e.g., diagonal corners of a card). The distance between the two points (or the area circumscribed by three or more points) is discerned, and expressed as a percentage of the diagonal size of the image frame (or its area). A single output parameter, A, which may be a seven-bit binary representation, is output.

As with X-Y data, the gestural decoding module can likewise monitor changes in the scale state parameter since the last frame, and product a corresponding output parameter A'. This parameter can be expressed in two's complement form, with positive values indicating movement of the object towards the sensor since the last frame, and negative values indicating movement away.

A differential scale parameter, B, can be discerned by reference to four reference points on the object (e.g., center points on the four edges of a card). The two points on the side edges of the card define a horizontal line; the two points on the top and bottom edges of the card define a vertical line. The ratio of the two line lengths is a measure of differential scale. This ratio can be expressed as the shorter line's length as a percentage of the longer line's length (i.e., the ratio is always between zero and one). Again, a two's complement seven-bit representation can be used, with positive values indicating that the vertical line is shorter, and negative values indicating that the horizontal line is shorter. (As before, a dynamic parameter B' can also be discerned to express the change in the differential scale parameter B since the last frame, again in two's complement, seven bit form.)

A rotation state parameter C can be discerned by the angular orientation of a line defined by two reference points on the object (e.g., center points on the two side edges of a card). This parameter can be encoded as a seven-bit binary value representing the percentage of rotational offset in a clockwise direction from a reference orientation (e.g., horizontal). (The two reference points must be distinguishable from each other regardless of angular position of the object, if data in the full range of 0–360 degrees is to be represented. If these two points are not distinguishable, it may only be possible to represent data in the range of 0–180 degrees.) As before, a dynamic parameter C' can also be discerned to express the change in the rotation state parameter C since the last frame. This parameter can be in seven bit, two's complement form, with positive values indicating change in a clockwise rotation The foregoing analysis techniques, and representation metrics, are of course illustrative only. The artisan will recognize many other arrangements that can meet the needs of the particular applications being served.

In the illustrative system, the application programs communicate with the gestural decoding module through a standardized set of interface protocols, such as APIs. One API can query the gestural input module for some or all of the current position parameters (e.g., any or all of X, Y, A, B, and C). The module responds to the calling application with the requested parameter(s). Another API can query the gestural input module for some or all of the current movement data (e.g., any or all of X', Y', A', B' and C'). Still another API can request the gestural decoding module to provide updated values for some or all of the position or movement data on a running basis, as soon as they are discerned from each frame. A complementary API discontinues the foregoing operation. By such arrangement, all of the gestural data is available, but the application programs only obtain the particular data they need, and only when they ask for it.

In applications that communicate with external servers, just the Bedoop data (i.e., CLASS, DNS, and optionally UID) may initially be sent. If the remote server needs to consider gestural data in deciding how to respond, the remote server can poll the local system for the necessary data. The requested gestural data is then sent by the local system to the remote server in one or more separate transmissions.

In other embodiments, since the gestural data is of such low bandwidth (e.g., roughly 56 bits per image frame), it may routinely and automatically be sent to the remote computer, so that the gesture data is immediately available in case it is needed. In an illustrative implementation, this data is assembled into an 8-bate packet, with the first byte of the packet (e.g., the X parameter) being prefixed with a "1" sync bit, and subsequent bytes of the packet being prefixed with "0" sync bits. (The sync bits can be used to aid in accurate packet decoding.)

In some embodiments, it is useful to provide for an extension to the normal 64-bit Bedoop length to accommodate an associated packet of gestural data. This can be effected by use of a reserved bit, e.g., in the UID field of the Bedoop packet. This bit normally has a "0" value. If it has a "1" value, that indicates that the Bedoop data isn't just the usual 64 bits, but instead is 128 bits, with the latter 64 bits comprising a packet of gestural data.

Similar extension protocols can be used to associate other ancillary data with Bedoop data. A different reserved bit in the UID field, for example, may signal that a further data field of 256 bits follows the Bedoop data—a data field that will be interpreted by the remote computer that ultimately services the Bedoop data in a known manner. (Such bits may convey, e.g., profile data, credit card data, etc.) The appended data field, in turn, may include one or more bits signaling the presence of still further appended data.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A system helpful to teach a child to read, comprising:
an image sensor;
a speaker; and
a processor coupled to said image sensor and speaker, the processor comprising a steganographic watermark detector for sensing steganographic watermark data on a book page presented to the image sensor, and for causing the speaker to produce sounds corresponding to reading of words on said book page.

2. A method comprising:
sensing a page of a children's book with an image sensor;
decoding a digital watermark from image data produced by the image sensor; and
triggering an action associated with said page, said action comprising generating audible sounds corresponding to reading of words on said book page.

3. The method of claim 2 wherein said sounds are assembled from component phonemes or common words previously recorded by a person.

4. The method of claim 3 wherein said component phonemes or common words are stored locally, and correspond to a child or a child's family member.

5. The method of claim 3 wherein said component phonemes or common words are stored remotely, and correspond to a celebrity voice.

6. The method of claim 2 that further comprises starting playback of a video at a point corresponding to said page.

7. A method comprising:
providing a book to a child, the book comprising printed pages, each page being steganographically encoded with plural bit data, one page being encoded with first plural bit data and a further page being encoded with second plural bit data different than the first plural bit data;
the child presenting said one page of the book to a reading station, the reading station including a processor, an optical scanner, a memory, and a speaker, the scanner providing visible light scan data to the processor; the processor decoding said visible light scan data to decode the first plural bit data, the processor accessing stored voice data from the memory in accordance with said decoded first plural bit data, and causing said stored voice data to be rendered using said speaker;
the child turning to said further page of the book, and presenting said further page to the reading station, the processor of the reading station decoding visible light scan data corresponding to said further page to decode the second plural bit data, and accessing different stored voice data from the memory in accordance with said decoded second plural bit data, and causing said different stored voice data to be rendered using said speaker;
wherein the child controls an automated read-aloud process, assisting the child in learning to read.

8. A children's book comprising plural pages, one of said pages being steganographically encoded with first plural bit data, and another of said pages being steganographically encoded with second, different, plural bit data, said steganographic encoding not being apparent to human observers of the pages, but can be decoded from image data produced by visible light scanning of said pages, wherein the first and second plural-bit data serves to index first and second digitized auditory information, respectively.

9. A method comprising:
- sensing a page of a children's book with an image sensor;
- decoding machine-readable information from image data produced by the image sensor; and
- triggering an action associated with said page, wherein said action comprises starting playback of a video at a point corresponding to said page.

10. The method of claim 9 that comprises starting playback of the video at an intermediate point between a start and an end of said video, said intermediate point corresponding to said page.

* * * * *